United States Patent
Wick et al.

[11] 3,731,994
[45] May 8, 1973

[54] METHOD OF RECORDING, DUPLICATING AND REPRODUCING IMAGES IN THE FORM OF RELIEF PATTERNS

[75] Inventors: Richard Wick, Munich; Friedrich Bestenreiner, Grunwald, both of Germany

[73] Assignee: Agfa-Gevaert Aktiengesellschaft, Leverkusen, Germany

[22] Filed: July 22, 1971

[21] Appl. No.: 165,150

[30] Foreign Application Priority Data

July 25, 1970 Germany.................P 20 37 038.1

[52] U.S. Cl................352/38, 95/36, 178/5.4 CD, 350/162 SF, 355/20, 355/77
[51] Int. Cl........................G03b 19/18, G03b 21/32
[58] Field of Search...............352/38; 350/162 SF; 355/20, 77, 32; 95/36, 12.2, 1; 178/5.4 CD

[56] References Cited

UNITED STATES PATENTS

| | | | |
|---|---|---|---|
| 3,436,216 | 4/1969 | Urbach | 350/162 SF X |
| 3,624,278 | 11/1971 | Heckscher | 95/12.2 |
| 3,597,069 | 8/1971 | Heinonen, Jr. | 350/162 SF X |
| 3,488,190 | 1/1970 | Smith | 350/162 SF |

*Primary Examiner*—Robert P. Greiner
*Attorney*—Michael S. Striker

[57] ABSTRACT

The exposed emulsion layer on a transparent carrier of motion picture film is converted into a relief pattern which is thereupon transferred onto a master record. The master is used for the making of duplicate films and the images represented by relief patterns on the duplicate films are reproduced by a Schlieren process or a phase contrast process.

13 Claims, 4 Drawing Figures

PATENTED MAY 8 1973 3,731,994

INVENTOR
RICHARD WICK
FRIEDRICH BESTENREINER
BY
Michael S Striker
ATTORNEY 3,731,994

METHOD OF RECORDING, DUPLICATING AND REPRODUCING IMAGES IN THE FORM OF RELIEF PATTERNS

BACKGROUND OF THE INVENTION

The present invention relates to a method and of recording, duplicating or multiplying and reproducing information in the form of images which are exposed on photographic film, especially motion picture film. More particularly, the invention relates to a method wherein the duplicating operation involves making thermoplastic pressings from a master record.

It is already known to convert discrete frames of a motion picture film into phase holograms, and the relief structure of such holograms is thereupon galvanically transferred onto a master record. The latter is then used for mass production of duplicate hologram pressings on film of thermoplastic material in the presence of heat. The thus obtained pressings are inexpensive and the information which is recorded thereon can be reproduced in a special apparatus with the help of a laser beam and by resorting to a television receiver tube which is placed into the area where the image is being reproduced. A drawback of such procedure is that the method of making the master record for the hologram pressings, especially the holographic step and the reconstruction of images which are recorded on the pressings, involves substantial expenditures for complicated equipment.

SUMMARY OF THE INVENTION

An object of the invention is to provide a novel and inexpensive method of making master records and a novel and inexpensive method of reproducing the information which is recorded on duplicate pressings.

Another object of the invention is to provide a novel and inexpensive method of making duplicate record pressings of exposed motion picture films.

The method of the present invention is employed for recording, duplicating and reproducing images, particularly images which are exposed on motion picture film. The method comprises the steps of exposing a photosensitive emulsion layer on a transparent carrier to scene light to thus transform the emulsion layer into a varying-density layer, converting the varying-density emulsion layer into a relief pattern which is representative of the recorded image, transferring the relief pattern onto a master record, duplicating the relief pattern of the master onto duplicate records consisting of transparent thermoplastic material, and reproducing the images which are represented by the relief patterns on duplicate records by resorting to a Schlieren process or to a phase contrast method.

The relief pattern on the transparent carrier can be provided with a grating or raster prior to transfer onto a master record. Such grating can be obtained by imaging onto the emulsion layer at least one raster during exposure of the emulsion layer to scene light, i.e., prior to conversion of the exposed emulsion layer into the relief pattern. Alternatively, the material of the relief pattern can be subjected to a wrinkling or shriveling treatment prior to transfer of the relief pattern onto the master record.

The converting step may include subjecting the exposed varying-density emulsion layer to a reversal development treatment and thereupon to a special tanning or bleaching treatment. Alternatively, the converting step may comprise copying the exposed varying-density emulsion layer onto a photoresist material. Still further, the converting step may comprise exposing the varying-density emulsion layer onto a strongly absorbent photographic layer on a transparent carrier by exposing through such carrier, thereupon subjecting the strongly absorbent photographic layer to a special tanning or bleaching development treatment, and removing the unbleached or untanned gelatine of the photographic layer.

The transferring step preferably comprises galvanically transferring the relief pattern onto the master record, and the duplicating step is preferably similar to that which is employed for the mass-production of duplicate phonograph records from a master record.

The exposing step may comprise repeatedly exposing the emulsion layer on the transparent carrier to light in different colors and superimposing on the emulsion layer prior to each exposure gratings having different grating constants or by resorting to a single grating which is superimposed on the emulsion layer prior to each of the series of exposures at a different azimuth angle.

The reproducing step may comprise producing color television signals and the exposing step then comprises exposing the emulsion layer once without a grating to produce a luminance image and at least once with a grating to produce one or more chrominance images.

The exposing step may further comprise exposing the emulsion layer to an image-controlled laser beam or to an image-controlled electron beam.

The novel features which are considered as characteristic of the invention are set forth in particular in the appended claims. The improved method itself, however, together with additional features and advantages thereof, will be best understood upon perusal of the following detailed description of certain specific embodiments of apparatus for the practice of the method with reference to the accompanying drawing.

DESCRIPTION OF THE PREFERRED EMBODIMENTS

FIG. 1a illustrates a portion of a conventional film having a transparent carrier sheet 1 and an emulsion layer 2. Upon exposure to scene light and subsequent conventional developing treatment, the emulsion 2 exhibits portions 2a, 2b, 2c of greater and lesser darkness. The density of hatching shown in the portions 2a–2c is intended to indicate various darknesses. Such distribution of darker and lighter areas in an exposed and developed emulsion layer can be reproduced with sufficient accuracy only by a color giving method such as copying on light-sensitive material or printing. Such reproducing methods are complicated and expensive because they involve the use of a costly photosensitive material and a costly wet treatment.

Figure 1:
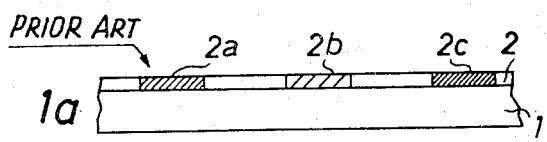
FIG. 1a is a schematic fragmentary elevational view of a conventional motion picture film having a transparent carrier and an exposed varying-density emulsion layer.
FIG. 1b is a similar view of the film but with the emulsion layer converted into a relief pattern.
FIG. 1c is a similar view of the film wherein the relief pattern of FIG. 1b is provided with gratings.
Figure 1:
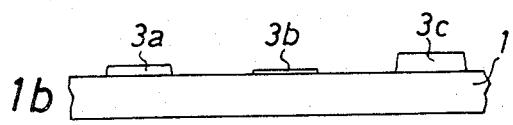
Figure 1:
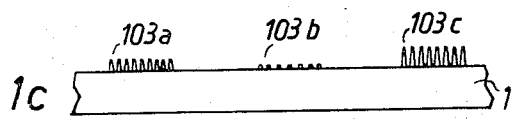

FIG. 1b illustrates a modified and processed film wherein the lighter and darker areas of the recorded image are represented by a relief pattern 3a,3b,3c. The height of the portions of such relief pattern is indicative of the darkness of the respective parts of the recorded image. The film can be processed in a manner as shown in FIG. 1b by a special treatment of the exposed and developed emulsion layer on the transparent carrier 1. The emulsion is bleached subsequent to completion of the developing treatment. A suitable bleaching bath which can be used to form the relief pattern 3a–3c of FIG. 1 is disclosed in "Photographic Science and Engineering", January/February 1970, page 5, lower part of the left-hand column. The bath contains the following ingredients:

| | |
|---|---|
| potassium alum | 20 grams |
| sodium sulfate | 25 grams |
| potassium bromide | 20 grams |
| copper sulfate | 40 grams |
| sulphuric acid | 5 ml |
| water | 1,000 ml |
| potassium bichromate to saturation. | |

The bleaching in such bath produces on the carrier 1 the relief pattern 3a–3c of FIG. 1b wherein the height of projections or protuberances is proportional to the degree of density of portions 2a–2c shown in FIG. 1a. Such bleaching process is also known as tanning development of films.

Instead of bleaching or tanning development of photographic film whereon a silver salt layer is exposed to scene light, one can resort to other procedures for obtaining the relief pattern of FIG. 1b. For example, the variable-density emulsion layer can be converted into a relief pattern by a reversal development or reversal processing followed by a tanning development or bleaching. Furthermore, the variable-density emulsion layer of the type shown in FIG. 1a can be copied on a material which is coated with a photoresist material and is thereupon subjected to a developing treatment. Still further, the variable-density image can be exposed onto a strongly absorbent photographic emulsion layer on a transparent carrier by exposing through the carrier and by thereupon subjecting the layer to a tanning development or bleaching treatment. The unexposed and untanned gelatine which remains on the surface can be readily washed away. The exposure, especially on photoresist material having a relatively low sensitivity, is preferably carried out by resorting to point-by-point illumination by means of a image-controlled laser beam or by means of a sharply focussed electron beam.

In accordance with a special reproducing process, the so-called Schlieren process, only the flanks or outlines of the raised portions 3a–3c of the relief pattern of FIG. 1b are made visible. Consequently, the zones of constant layer thickness cannot be distinguished from other zones of constant layer thickness even though the thicknesses of such zones are different. Thus, only the margins or outlines of strongly darkened zones of an image will be rendered visible.

Such drawback can be overcome by providing the raised portions of the relief pattern with a fine raster or grating which insures continuous variations of the length of optical paths over the entire area which contains recorded information. Such relief pattern which is provided with gratings or rasters is shown in FIG. 1c. The gratings in the raised portions 103a, 103b, 103c of FIG. 1c can be obtained, for example, by copying the variable-density image of FIG. 1a with an absorption grating superimposed thereon. It is also possible to resort to line-by-line recording with the help of an image-controlled light beam by increasing the distance between successive lines. No gratings or rasters will develop in areas which carry no recorded information. The formation of gratings or rasters brings about particular advantages when the recorded information contains several separate colors of a color image which are superimposed upon each other by resorting to gratings having different grating constants or to a single grating which is superimposed at different azimuth angles. This insures the formation of gratings or rasters on all surfaces which carry recorded information. Reference may be had to the copending application Ser. No. 230,065 of Bestenreiner et al. which is owned by the assignee of the present application.

Instead of providing the portions of the relief pattern 3a–3c shown in FIG. 1b with gratings, it is also possible to impart to the remaining portions (3a–3c) of the gelatin layer a reticulated or wrinkled outline. This also eliminates the aforementioned "outline" effect which was discussed in connection with FIG. 1b. Such wrinkling can be achieved by rapid drying of the water-containing gelatin layer so that the surface of the layer dries first and undergoes a certain amount of hardening. The zones below the dried and hardened surface layer undergo a gradual drying action with attendant shriveling or wrinkling.

The relief patterns of FIG. 1b or 1c are thereupon duplicated by resorting to same or similar galvanizing techniques as utilized in mass-producing duplicate photograph records from master records. Thus, the surface of the relief pattern can be coated with a separating agent and made conductive. In the next step, a layer of nickel and additional layers are deposited on the separating agent and are thereupon transferred onto a carrier, such as a flexible steel band, which constitutes a master and is thereupon heated and pressed against a strip of thermoplastic material (e.g., a foil of polycarbonate). Such pressing procedures can be resorted to for highly accurate reproduction of the relief pattern on the master and can be employed for continuous mass production of duplicate records by employing heated rollers one of which carries the master and another of which presses successive increments of a continuous strip of thermoplastic material against successive increments of the master. The thus-obtained duplicate film remains completely clear and its interior undergoes no appreciable changes in optical characteristics. The relief patterns on the surfaces of such duplicate films can be discerned only upon very close scrutiny.

Figure 2:
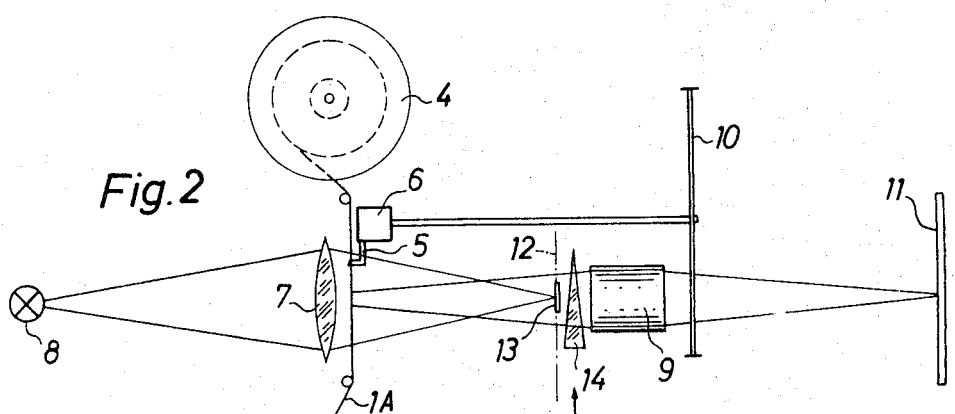
FIG. 2 is a schematic elevational view of an apparatus for the reproduction of information of the type shown in FIGS. 1b and 1c.

FIG. 2 illustrates an apparatus for reproduction of information from duplicate films 1A which are obtained by resorting to masters of the type having relief patterns shown in FIG. 1b or 1c. The duplicate film 1A is stored on a supply reel 3 and is transported toward and collected by a takeup reel 4. The film transporting mechanism 6 comprises a conventional claw pull-down or intermittent 5 of the type normally used in cinematographic apparatus and serving to advance the duplicate film 1A in stepwise fashion. The light source 8 directs light against a condenser lens 7 which images the light source in a spatial frequency plane 12 in close or immediate proximity of an objective 9. The objective 9 is mounted in front of a revolving shutter 10 whose operation is synchronized with the operation of the pull-down 5 in such a way that the opening or openings of the shutter 10 will transmit light when the pull-down 5 is idle and that the shutter 10 blocks the passage of light when the pull-down is in motion to transport the duplicate film 1A by a step. The screen on which the images are reproduced is shown at 11.

An opaque diaphragm 13 is mounted in the spatial frequency plane 12 and serves to insure that the non-dispersed or non-diffracted light which passes through the duplicate film 1A, i.e., the zero diffraction order, cannot reach the screen 11. The light which is diffracted at the flanks of the raised relief portions 3a–3b shown in FIG. 1b bypasses the diaphragm 13 and reaches the objective 9. The corresponding portions of the image are reproduced on the screen as light areas. If the duplicate film 1A is provided with relief patterns 103a–103c of FIG. 1c, the screen 11 reproduces a negative of the original image. Thus, depending on the nature of the original image, it might be necessary to resort to a copying or reversing process so as to obtain on the screen 11 a positive image. The process employing an opaque diaphragm 13 whose dimensions correspond to those of the light source 8 is known as Schlieren process.

Figure 3:
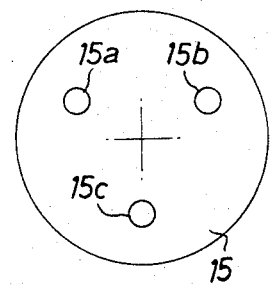
FIG. 3 is a front elevational view of a diaphragm for use in the spatial frequency plane of the apparatus shown in FIG. 2.

The problem that the relief pattern 3a–3c of FIG. 1b must be provided with gratings of the type shown in FIG. 3 can be avoided by resorting to a different reproducing technique which is known as the phase contrast process. In accordance with the phase contrast process, the diaphragm 13 of FIG. 2 is replaced with a phase shifting means preferably a λ/4 plate having the same dimensions as the light source 8. The apparatus then further comprises a grey wedge or filter 14 (shown in FIG. 2) which is shiftable transversely of the optical axis of the objective 9 as indicated by the arrow. The phase contrast process relies on the phenomenon that, due to different optical distances in the duplicate film 1A, the diffracted and non-diffracted portions of light interfere with and cancel each other in the plane 12, depending on the extent of the phase shift between various portions of light. Such effect is enhanced by the utilization of the λ/4 plate which increases the phase difference 180° so as to enhance the cancelling effect of various light portions. The wedge 14 allows for proper balancing of the intensity of diffracted and non-diffracted portions of light to thus allow for an optimum adjustment of the visible image. Since the phase contrast process relies on a phase shift which takes place in the duplicate film 1A and which contributes to the reproduction of images, the aforementioned outline effect does not develop so that a duplicate film having a relief pattern 3a–3c of the type shown in FIG. 1b will insure on the screen 11 uniform coloration of areas which correspond to the portions 3a–3c of the relief pattern shown in FIG. 1b.

The just-discussed phase contrast process is known from the art of microscoping techniques in connection with thin layers of low contrast. However, the known processes cannot be resorted to without substantial modifications. Thus, the emission of the light source 8 must be properly related to the λ/4 plate, i.e., one can employ a light source which emits light in a single color. Also, the difference between various optical lengths in the duplicate film 1A should not exceed a certain range, namely, λ/4. This insures a constant transmission characteristic of such reproducing procedure. Similar satisfactory results can be obtained with careful regulation of the exposure, development and bleaching.

FIG. 3 illustrates on a larger scale a diaphragm 15 which can be used in the spatial frequency plane 12 of the apparatus shown in FIG. 2. This diaphragm can be used for color reproduction of images in accordance with the Schlieren process. The exposures are to be made in the three colors by resorting to a grating which is turned through 120° subsequent to each exposure. The grating has a fixed grating constant. The openings 15a,15b,5c of the diaphragm 15 correspond to the first diffraction orders of such carrier frequency recordals. When the diaphragm 15 is mounted in the spatial frequency plane 12 of the apparatus shown in FIG. 2 and a filter in the corresponding color is placed in front of or into each of the openings 15a–15c, the screen 11 will reproduce a three-color image even though the light source 8 emits only white light and even though the duplicate film 1A merely contains a phase image.

Figure 4:
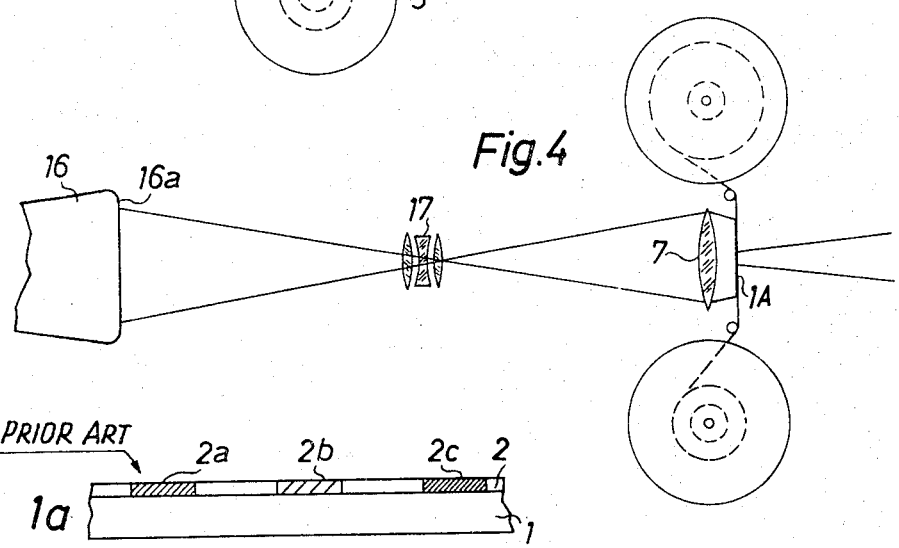
FIG. 4 illustrates certain details of a modified apparatus.

The information which is recorded on the duplicate film 1A can be fed directly to a television receiver by resorting to the structure shown in FIG. 4. The screen 11 of FIG. 2 is then replaced with a photoreceiver for the generation of a television signal. The light source 8 is replaced with a cathode ray tube 16 which causes a point source of light to travel along the screen 16a at the speed and along lines which are spaced as known from the television technique. The screen 16a is imaged by an objective lens system 17 onto a condenser lens 7 corresponding to the condenser lens of FIG. 2. The duplicate film 1A is guided along a path immediately behind the condenser lens 7. The diaphragm (not shown) in the spatial frequency plane is then constructed in such a way that it obscures the pupil of the objective 17 since the latter replaces the light source 8 of FIG. 2.

For the purpose of televising the images, it is desirable not to superimpose three different color images by resorting to carrier frequencies but rather to impress upon the emulsion layer a luminance image without gratings and chrominance images with gratings in the form of relief patterns. The diaphragm in the spatial frequency plane is then modified to conform to such image.

An important advantage of the making of duplicate films from masters having relief patterns of the type shown in FIGS. 1b and 1c is that the duplicate films can consist of clear thermoplastic material with no variations in their density. The fine relief patterns on such duplicate films can be rendered visible by the aforediscussed Schlieren or phase contrast process. Such processes can be carried out with apparatus (see FIGS. 2–4) which are much simpler than the apparatus for reconstruction of holograms. Moreover, the apparatus of FIGS. 2–4 can be readily converted for reproduction of images on conventional motion picture film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. A method of recording, duplicating and reproducing images, particularly images on motion picture film, comprising the steps of exposing a photosensitive emulsion layer on a transparent carrier to scene light to thus transform said emulsion layer into a varying-density layer; converting said varying-density emulsion layer into a relief pattern which is representative of the recorded images; transferring said relief pattern onto a master record; duplicating the relief pattern of the master record onto duplicate records of transparent thermoplastic material; and reproducing the images represented by the relief pattern on a duplicate record by a Schlieren or phase contrast process.

2. A method as defined in claim 1, further comprising the step of providing said relief pattern on said transparent carrier with a grating prior to transfer of such relief pattern onto a master record.

3. A method as defined in claim 2, wherein said step of providing said relief pattern comprises imaging onto the emulsion layer at least one raster during exposure of such emulsion layer to scene light prior to conversion of the exposed emulsion layer into said relief pattern.

4. A method as defined in claim 1, further comprising the step of wrinkling the material of said relief pattern on said transparent carrier prior to transfer of such relief pattern onto a master record.

5. A method as defined in claim 1, wherein said converting step comprises subjecting the exposed varying-density emulsion layer to a reversal development treatment and thereupon to a tanning development treatment.

6. A method as defined in claim 1, wherein said converting step comprises copying the exposed varying-density emulsion layer onto a photoresist material and thereupon developing the photoresist material.

7. A method as defined in claim 1, wherein said converting step comprises exposing said varying-density emulsion layer onto an absorbent photographic layer on a transparent carrier by exposing through such carrier, thereupon subjecting the absorbent photographic layer to a tanning development and removing the untanned portions of said absorbent photographic layer.

8. A method as defined in claim 1, wherein said transferring step comprises galvanically transferring said relief pattern onto said master record.

9. A method defined in claim 1, wherein said step of exposing comprises separately exposing said emulsion layer to light in different colors and superimposing on said emulsion layer prior to each separate exposure thereof gratings having different grating constants.

10. A method as defined in claim 1, wherein said step of exposing comprises repeatedly exposing said emulsion layer to light in different colors and superimposing on said emulsion layer prior to each exposure a grating at a different azimuth angle.

11. A method as defined in claim 1, wherein said reproducing step comprises producing color television signals and said exposing step comprises exposing said emulsion layer once without a grating to produce a luminance image and at least once with a grating to produce at least one chrominance image.

12. A method as defined in claim 1, wherein said step of exposing comprises exposing said emulsion layer to an image-controlled laser beam.

13. A method as defined in claim 1, wherein said step of exposing comprises exposing said emulsion layer to an image-controlled electron beam.

* * * * *